Aug. 4, 1964

H. L. DUDLEY ETAL 3,142,983

HEAT TRANSFER TEST DEVICE

Filed Aug. 29, 1960

INVENTOR.
HUDSON L. DUDLEY
BY HENRY F. SNELLING
ALVIN M. MAHER, JR.

W Robert Baylor
ATTORNEY

Aug. 4, 1964  H. L. DUDLEY ETAL  3,142,983
HEAT TRANSFER TEST DEVICE
Filed Aug. 29, 1960  5 Sheets-Sheet 2

INVENTOR.
HUDSON L. DUDLEY
HENRY F. SNELLING
ALVIN M. MAHER, JR.
BY
W. Robert Baylor
ATTORNEY

INVENTOR.
HUDSON L. DUDLEY
HENRY F. SNELLING
ALVIN M. MAHER, JR.

BY W. Robert Baylor
ATTORNEY

# United States Patent Office 3,142,983
Patented Aug. 4, 1964

3,142,983
HEAT TRANSFER TEST DEVICE
Hudson L. Dudley, Herndon, Henry F. Snelling, Woodbridge, and Alvin M. Maher, Jr., McLean, Va., assignors to Melpar, Inc., Falls Church, Va., a corporation of Delaware
Filed Aug. 29, 1960, Ser. No. 52,533
13 Claims. (Cl. 73—190)

This invention relates generally to a heat transfer test device and more particularly to a heat transfer test fixture which provides a convenient and standardized means for measuring the rate of heat transfer from an electronic module to the cooling air stream in a controlled temperature environment surrounding the module.

Further, this invention relates to a heat transfer test fixture which offers facilities not previously available for obtaining accurate temperature measurements required in the design of reliable electronic modules with specific heat transfer characteristics.

The prior art discloses that it has been proposed for such test devices to utilize a large amount of insulation around the module to measure heat transfer characteristics of the module only under conditions approaching heat balance between the module and its surroundings.

Prior to the present invention, it has been customary for each technician working with heat transfer design to have his own method of determining the efficiency or effectiveness of his design. Different test methods frequently produce different results. The heat transfer test fixture described herein provides a simple, standardized testing method needed to enable the technician to differentiate between good and poor heat transfer design.

The heat transfer test fixture is unique in that it nullifies the heat loss from the module by employing a novel heat transfer null method. The test fixture housing specifically includes three chambers; namely, the inlet air chamber, the outlet air chamber and the module test chamber. The test chamber in the vertical plane is enclosed by heating walls which can be physically arranged and adjusted to accommodate modules of various sizes. These heating walls are placed around the module to balance the heat transfer between the module and its surrounding environment. Once this heat balance is obtained, heat loss ceases to be a problem. The use of such heating walls also allows a variation in temperature range not achievable with other testing techniques.

Therefore, according to the present invention, the heat transfer test fixture allows heat transfer characteristics to be determined under condition of heat unbalance as well as heat balance between the module and its surroundings. Further, the heat transfer test fixture allows more accurate simulation of the conditions surrounding the module when in actual use; for example, to simulate the actual operating conditions of a module mounted within a unit of electronic equipment.

The test data obtained with the heat transfer test fixture indicates the amount of air needed to cool a module sufficiently for various inlet air temperatures and various surrounding wall temperatures. The test data also permits the determination of the minimum air flow requirements of modules when the inlet air temperature varies from module to module within a unit. In addition, the test fixture affords data on the cooling air pressure drop across the module.

It is the principal object of the invention to provide a heat transfer test fixture with movable heating walls for simulating surrounding ambients for a module under test and further to provide a test fixture with cooling and heating plates for controlling the temperature of the inlet air to the test chamber. In one of its features, the invention accepts forced-air-cooled electronic modules having varying dimensions. In another feature, the invention simulates module temperature environment; for example, in the preferred embodiment disclosed herein, the conditions could be 0.4 pound of dry inlet air per minute over a temperature range of —20° C. to +70° C. In another feature, the test fixture according to the invention provides data for determining the amount of air needed to provide sufficient cooling of modules under a given set of environmental conditions. Still another feature of the invention is that the test fixture offers a means for determining the cooling air pressure drop across the module.

An important object of the invention is to provide a heat transfer test fixture in which the temperature in the test chamber can be easily controlled by use of the movable heating walls surrounding the module as a means for thermally insulating the module, or as a means for transferring heat to or from the module under test. The heated walls of the test fixture provide a means for obtaining a heat balance condition between the module (or heat dissipator) under test and the heated walls. This method of attaining heat balance is believed to be unique since it also enables measurement of heat transfer between modules (or dissipators) and walls at other points at various percentages above and below the heat balance condition.

Another object is to provide a heat transfer test fixture in which the use of an integral inlet air chamber having cooling and heating plates can easily control the inlet air temperature to the test chamber. As a result the cooling and heating plates will control the amount of air mass necessary to keep the module in the test chamber below its maximum operating temperature under various environment conditions. The unique method involved may be used to devise tests for any air cooled modules.

A further object of the invention is the provision of testing of an air cooled electronic module with a minimum of expensive and elaborate equipment. The heat transfer test fixture can be easily disassembled to facilitate rapid interchange of modules.

Still another object is to provide a heat transfer test device of the above type which is accurate, reliable, inexpensive and easy to operate and whose test results are reproducible.

A final object of the present invention is the provision of a heat transfer test fixture which offers the design engineer a reliable scale for measuring the performance and comparing the heat transfer designs of electronic modules. It provides him with design information about individual modules and with information on the heat balance among several modules in a unit.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
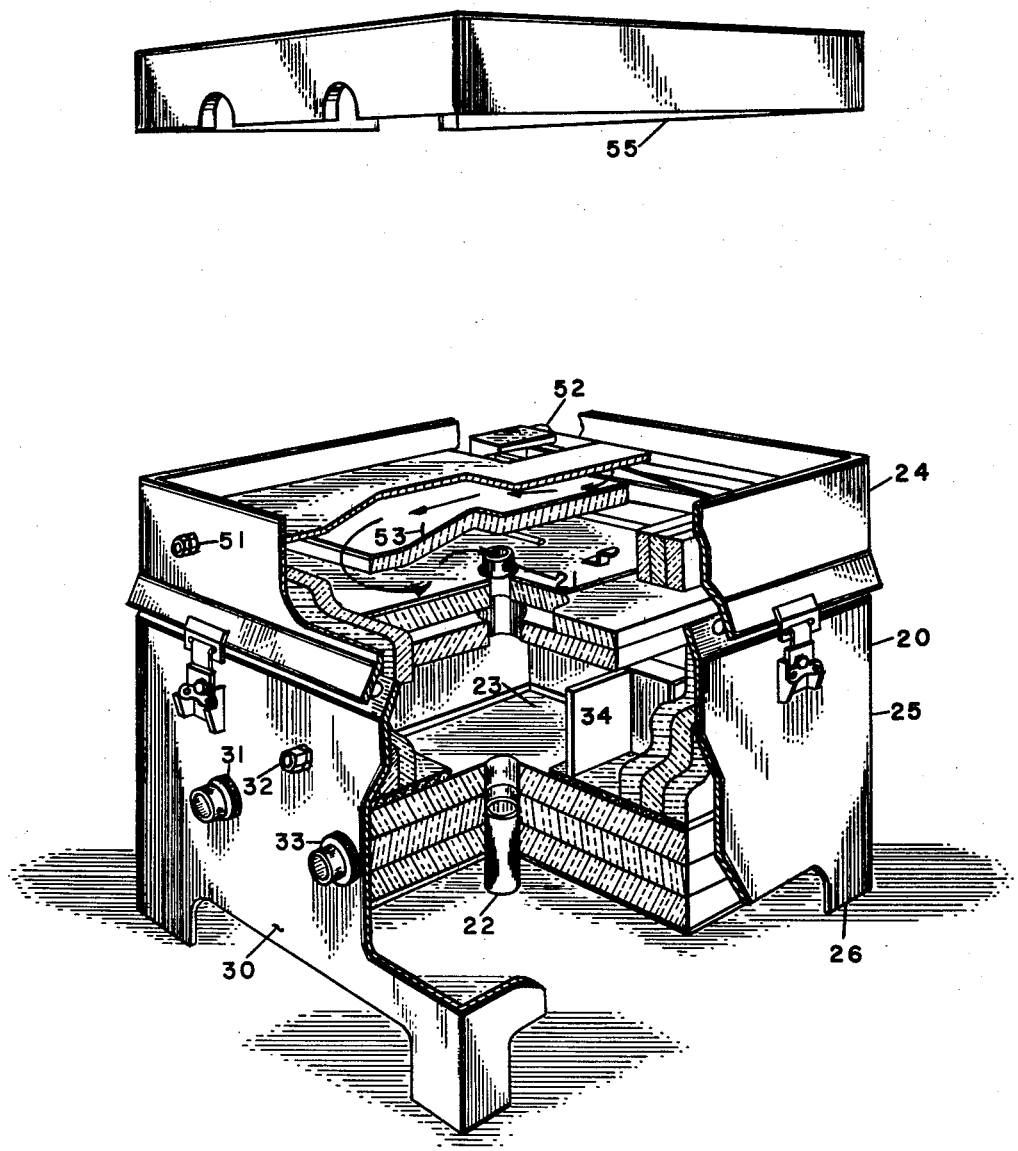
FIGURE 1 is a perspective view of the heat transfer test fixture, partially exposed to show the components therein.
Figure 2:
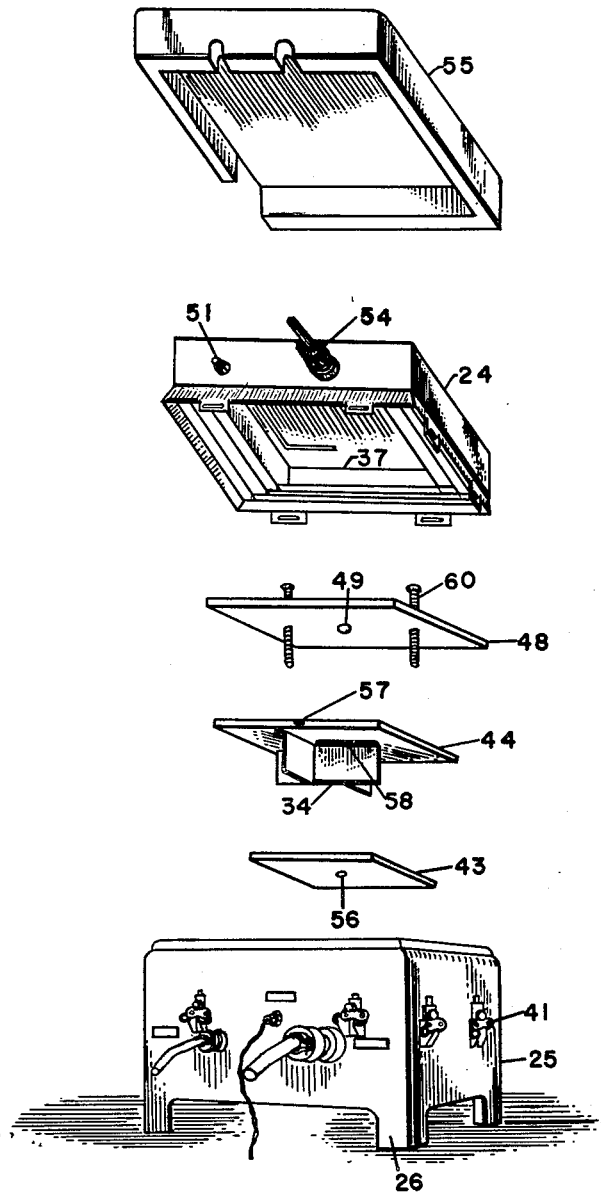
FIGURE 2 is an exploded view of the heat transfer test fixture of FIGURE 1.

Specifically describing the embodiment of the invention illustrated in FIGURES 1 to 4, the reference character 20 generally designates the heat transfer test fixture having a rectangular body and a multiplicity of interconnected compartments therein. The fixture housing 20 preferably is formed of metal. The multi-compartment fixture 20 has essentially three chambers, i.e. the inlet air chamber 21, outlet air chamber 22, and the test chamber 23 in which a desired electronic module (not shown) is placed. The inlet air chamber 21, and the outlet air chamber 22 are preferably provided with suitable insulation to prevent rapid heat transfer to the metallic housing.

In the embodiment illustrated herein, the test fixture 20 is shown as including a top member 24 being mounted on a base member 25. A plurality of leg members 26 support the base member 25 in a horizontal plane.

The base 25 contains a small opening 27 in the bottom thereof to allow the cooling air to pass from the module test chamber 23 to the exterior of the fixture 20. A conventional type of thermocouple 28 attached to a screen 29 in the outlet air chamber 22, measures the outlet air temperature. On wall 30 of the base 25 are openings 31, 32 and 33 for receiving electrical power source receptacle for heating walls 34, a thermocouple feed-through unit, and a module electrical connector, respectively. The bottom and side walls of fixture 20 preferably contain three layers 35, 36 and 37 of "Marinite" insulation as shown in FIGURES 3 and 4.

Figure 3:
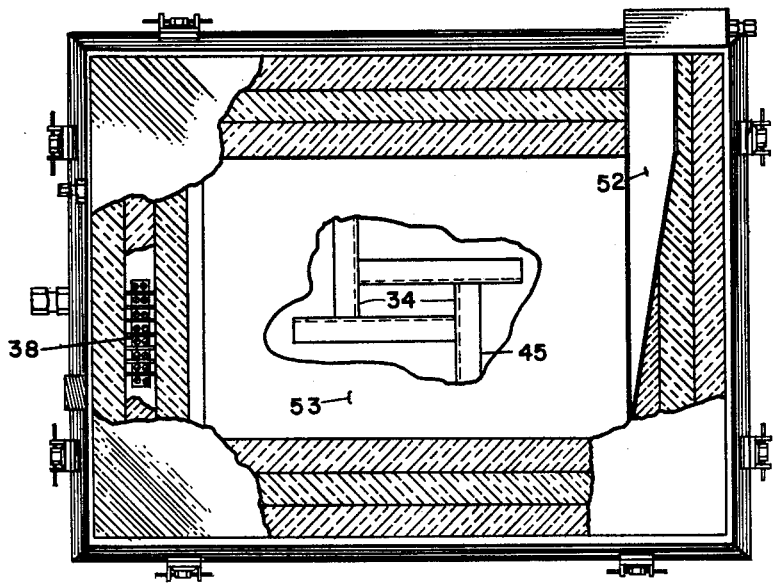
FIGURE 3 is a top sectional view of the heat transfer test fixture showing the unique arrangement of the heating walls surrounding the test chamber.
Figure 4:
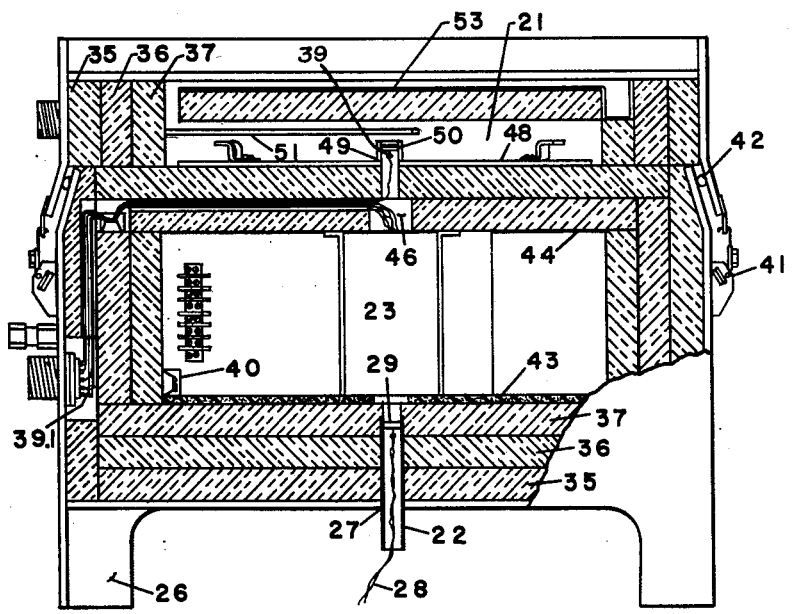
FIGURE 4 is a side sectional view of the heat transfer test fixture.

From FIGURES 3 and 4, it may be seen a terminal block 38 is mounted on top of one of the layer walls 36 to accept the thermocouple and module electrical leads 39.1. A terminal block 40 for the interior connections to the heating walls 34 is illustrated in FIGURE 4.

Eight latches 41 hold the top 24 firmly against the base 25 during the testing operation. Two latches 41 are mounted on each side of the fixtures 20. An O-ring gasket 42 maintains air-tight seal between the top 24 and the base 25.

An insulating gasket 43 is placed in the bottom of the base 25 over the insulated layers 35, 36, 37 to serve as an air seal between the module and the heating walls 34 and between the test chamber 23 and the outlet air chamber 22.

A mounting plate 44 positioned above the insulating gasket 43 provides structural support for the suspension of the heating walls 34 and the module. As readily seen from the top view of FIGURE 3, the heating walls 34 can be positioned and arranged to accommodate a variety of module sizes. One end of each of the heating walls 34, namely portion 45, is in physical contact with the side of the adjacent wall 34. It will be clear therefore the arrangement of the vertical heating walls 34 in an offset relationship, forms movably mounted adjustable wall members which may surround the desired size module.

The electrical and thermocouple leads 39.1 pass through a hole 46 in the mounting plate 44 and along a groove 57 in the plate 44 to the terminal block 38.

The heat transfer test fixture 20 operates as follows:

Dry compressed air is passed through a flow meter 61 and is introduced into the air manifold 52. The right angle in the manifold 52 produces turbulence in the air and the wedge-shape of the manifold 52 produces a uniform flow of air over the surface of the air heating plate 53. Air passing between the heating plate 53 and the top member 24 may be either cooled by placing Dry Ice on the top member 24 or heated by the heating plate 53. In operation the cooled top member 24 and the heating plate 53 simultaneously cool and heat the air flow, respectively. The temperature of the heating plate 53 is varied by changing the voltage across it.

Air passes from the heating plate 53 into the inlet air chamber 21 and across a manometer pressure tip 51 for static pressure measurement. The air then passes through the aperture 49 in heat barrier 48. The aperture 49 is sized to produce a jet of air on the thermocouple bead 39 located on the screen 50 in the aperture 49. The velocity of the air jet should be at least eight feet per second to provide accuracy of the thermocouple reading.

The conditioned air then passes into the module under test. In the test chamber 23, the module is surrounded by movable heating walls 34 which can accurately simulate the temperatures of adjacent modules as they might be arranged under conditions of actual use. The controllable temperature feature of the heating walls 34 allows heat transfer characteristics of the module under test to be determined under conditions of heat unbalance as well as heat balance between the module and its surroundings.

After passing through the module under test, the air is exhausted through the opening 27 in base 25. The opening 27 is fitted with a screen 29 and a thermocouple 28 for measuring outlet air temperature. The opening 27 in base 25 is sized to produce a jet of air with a velocity of at least eight feet per second on the thermocouple bead 28.

It is to be especially noted that heat itself is used as the means for insulating against heat transfer to or from the module under test. The heating walls 34 utilized in the fixture 20 are considered to be superior to any type of insulation, regardless of thickness, which might be placed around the module. In addition to providing an excellent means for heat insulation, the walls 34 provide a convenient means for determining heat gain or loss characteristics of the module by varying the wall temperatures. The walls 34 can be made to closely simulate adjacent modules (as the device under test might "see" in actual use), either relatively hot or cold—or both. Wall temperatures can be varied independently if desired. Thus, the cooling requirements of the module under test can be quickly and conveniently determined for various conditions of simulated temperatures surrounding the module. This would include the condition of heat balance as well as a condition of heat transfer to or from the module under test.

The heat barrier panel 48, containing an inlet aperture 49 with thermocouple bead 39 and screen 50 isolates the heat in the inlet air chamber 21 from the test chamber 23.

The top member 24 contains the manometer tap 51, the inlet air manifold 52, and the inlet air heating plate 53. Incoming air is heated to the desired temperature by the inlet air heating plate 53 prior to the introduction of the air into the test chamber 23. An opening 54 to the electrical power source receptacle which supplies power to heat plate 53 is located on top 24.

The insulating cover 55, placed over the top 24, helps to prevent sublimation of the Dry Ice when Dry Ice is placed on the top surface to cool the inlet air.

In summary, it is stated that the heat transfer test fixture 20 facilitates the measurement of module inlet and outlet air temperatures, corrected air mass flow rate, pressure drop across the module, module case or frame temperature, module critical part temperature, heating wall temperatures, and other component part temperatures being monitored. The module inlet and outlet air temperatures, the heating wall temperatures, and the corrected air mass flow rate provide the basic data for the computation of heat transfer characteristics.

Temperatures of the selected module parts and housing members are monitored by thermocouple junctions attached to the desired points. Additional thermocouples measure the temperatures at other locations within the test fixture 20. Exterior connectors and internal terminal blocks afford easy access to the electrical and thermocouple leads and the manometer tap.

The overall size of the assembled fixture 20 in the preferred embodiment (including the insulating cover 55) is 19½ inches wide by 22 inches long by 23 inches high;

total weight is approximately 151 pounds. Electronic modules up to 9 inches wide by 11 inches long by 4½ inches high will fit in the present test chamber 13. The test fixture 20 will condition 0.4 pound of dry inlet air per minute over a temperature range of −20° C. to +70° C. The maximum input power (A.-C. or D.-C.) is 900 watts.

The exterior structure of the test fixture 20 in the embodiment disclosed herein is made of ¼-inch aluminum plate, with all seams heliarc welded. The insulation material on the interior of the fixture 20 consists of one-inch thick layers of Johns Manville "Marinite"; the insulating cover 55 is of the same material. The insulating gasket 43 placed in the bottom of the base 25 is made of closed-cell sponge rubber. Nylon-coated, 36-gauge, copper-constantan wire is recommended for thermocouple use.

The heat transfer test fixture 20, in this preferred embodiment, is designed to meet the test requirements of MIL-E-19600A.

The test fixture system described herein affords convenient operation and ease of assembly and disassembly to facilitate rapid testing of electronic modules. Since each module type requires a unique wiring and thermocouple setup, and since the air inlet and outlet orifices vary in size depending on the module tested, some preparation of the fixture units is necessary before testing can begin.

The following brief instructions indicate the procedures for properly assembling the test fixture.

The insulating gasket 43 is provided with an appropriately sized orifice 56 for the air outlet chamber 22, and the mounting plate 44 has an opening 46 of adequate size for the free flow of the inlet air and for the electrical and thermocouple leads from the module under test. The opening 46 in the mounting plate 44, however, should be as small as possible to prevent heat feedback from the test chamber 23 to the inlet air chamber 21. Also, a recessed groove 57 is located in the top of the mounting plate 44 to carry the electrical and thermocouple leads from the module to the terminal block 38.

To complete the mounting plate unit, it is necessary to fasten the module and the four heating walls 34 to the mounting plate 44. The securing means (not shown) for the module may be its normal mounting means or locating pins (with speednuts). A simulated chassis plate (not shown), located between the module and the mounting plate 44, may be added when required. The heating walls 34 are appropriately spaced around the module and attached to the mounting plate 44 with self-tapping screws 58.

To assemble the test fixture 20, first place the insulating gasket 43 in its proper position along the floor of the base 25. Connect the electrical power leads from the four heating walls 34 to the terminal block 38 located along the inside wall 37 of the test fixture 20. Next lower the mounting plate 44, with attached module and heating walls 34, into the test chamber 23, making certain that the insulating gasket 43 is in position to seal properly as intended. Place the module electrical and thermocouple leads 39 in the groove 57 along the top of the mounting plate 44 and connect them to the terminal strip 38 provided on the top of the base side wall 36. Insert the thermocouple 39 and screen 50 in the appropriate opening 49 in the heat barrier 48 and run the lead 39 through the groove 57 of the mounting plate 44 to the terminal block 38. The terminal block wiring is then completed.

If necessary, to prevent air ramming when large air flows are used, an air deflection plate (not shown) may be added between the inlet air thermocouple 39 and the module openings.

The heat barrier 48 is placed over the mounting plate 44. Two large bolts 60 are inserted and tightened to hold the units in place. Assembly of the test fixture 20 is completed by fastening the top 24 to the base 25 with the latches 41 provided. To cool the inlet air, Dry Ice may be placed on the top surface and the insulating cover 55 added. Cutaway views of the assembled test fixture 20 are shown in FIGURES 3 and 4.

Figure 5:
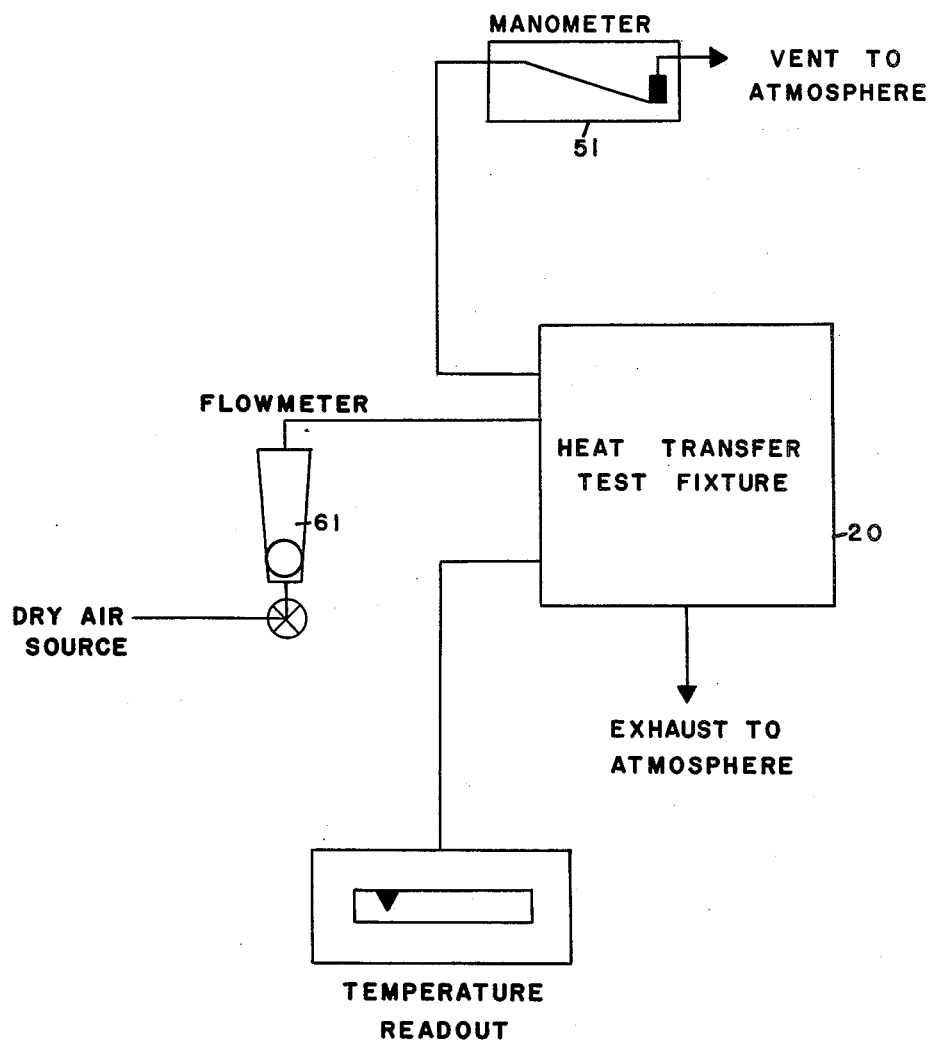
FIGURE 5 is a diagram of a typical test set up for the heat transfer test fixture.

The test setup is completed with the addition of a metered source of dry air and the connection of manometer, electrical, and thermocouple readout devices. Variable transformers (not shown) may be used to control the temperature of the heating walls 34 and the inlet air heating plate 53. A diagram of a typical test setup is shown in FIGURE 5.

The following precautions have been observed when conducting heat transfer tests:

(1) To prevent the formation of moisture or frost in the inlet air chamber 21 at low temperatures, the air provided to test fixture 20 must have a dew point below the minimum temperature required for the inlet air.

(2) To obtain accurate module inlet and outlet air temperature measurements, the apertures in mounting plate and insulating gasket 43 should be sized to produce an air jet with a velocity of at least eight feet per second over the thermocouple beads.

(3) When testing modules requiring a large air flow, it may be necessary to provide an air deflection plate (not shown) between the inlet air thermocouple and the openings in the module to prevent air ramming.

(4) The surface temperature of heating walls 34 must not exceed 150° C.

(5) The inlet air heating plate 53 should not be energized without air flow through test fixture 20.

(6) Do not place instruments on the aluminum top 24 as heat generated by high inlet air temperatures during testing may cause damage.

The following test symbols are used during the heat transfer testing and subsequent data reduction:

$t_i$ = module inlet air temperature
$t_o$ = module outlet air temperature
$t_w$ = average temperature of heating walls 34 surrounding module
$t_c$ = critical part hot-spot temperature
$w$ = cooling air mass flow rate
$C_p$ = specific heat of air at constant pressure
$\Delta t_a = t_o - t_i$
$q_a$ = heat removed by cooling air stream between module inlet and outlet
  = $C_p w \Delta t a$
$q_e$ = module heat dissipation
  = input power minus output power
$q_c$ = heat absorbed by module from heating walls 34 (algebraically negative when heat flow is in opposite direction)
$q_a = q_e + q_c$. When $q_a = q_e$, there is no net heat exchange between module and heating walls 34, and $q_c$ is zero.

After the module and the test fixture 20 have been prepared for the heat transfer test, but prior to the beginning of the test, an air leakage test is performed. An air leakage graph for the test setup is prepared from data obtained in the following manner:

(1) With module in place, the test fixture air outlet is completely sealed.

(2) Provide air pressure, in the module inlet air chamber 21, over the range expected during the tests.

(3) Record the air flow for each pressure.

(4) Plot a graph of air flow (leakage) versus pressure.

When calculating air flow during the heat transfer tests, the air leakage, at the indicated pressure drop across the module, shall be subtracted from the test apparatus flowmeter (60) indication to obtain the corected air mass flow rate.

Whereas the principles of operation of the heat transfer test fixture 20 have not been fully ascertained, and consequently the discussion below is not to be considered limiting, it is deemed that the functions disclosed herein of test fixture 20 are a preferred disclosure of the heat transfer test procedures.

The following heat transfer test sequence is used for forced-air-cooled modules:

*Step 1.*—With the module operating at full rated power and duty cycle, air flow is provided to the module and the module inlet air temperature is maintained at 70° C. The air flow rate and average heating wall temperature are adjusted until: (1) that detail part found first to approach its upper limiting temperature (critical part) operates a few degrees below that limit, and (2) $q_a = q_e$ (condition of heat balance).

After the test conditions have stabilized, the following is recorded:

(1) Pressure drop across the module.
(2) Corrected air mass flow rate (correction obtained from air leakage graph prepared during air leakage test).
(3) Module inlet and outlet air temperatures.
(4) Module case or frame temperature.
(5) Heating wall temperatures.
(6) Critical part temperature.
(7) Other part temperatures being monitored.

*Steps 2, 3, and 4.*—Step 1 is repeated with module inlet air temperatures of 40° C., 10° C., and −20° C., respectively. In each test run, adjustments are made to achieve, as closely as possible, the same critical part hot-spot temperature.

*Step 5.*—With the module operating at full rated power and duty cycle, air flow is provided to the module and the module inlet air temperature is maintained at 70° C. The air flow rate and average heating wall temperature are adjusted until: (1) that detail part found first to approach its upper limiting temperature operates a few degrees below that limit (achieve, as closely as possible, the same critical part hot-spot temperature as obtained in previous steps), and (2) $q_a = 1.5 q_e$.

*Step 6.*—With the module operating at full rated power and duty cycle, air flow is provided to the module and the module inlet air temperature is maintained at 70° C. The air flow rate and average heating wall temperature are adjusted until: (1) the same critical part hot-spot temperature ($t_c$) obtained in previous steps is achieved, as closely as possible, and (2) $q_a = 0.5 q_e$. (Note: The value of $t_c - t_i$ for Step 6 shall be as close as possible to that value obtained in Step 5.)

*Steps 7 and 8.*—Steps 5 and 6 are repeated, the module inlet air temperature is maintained at −20° C. instead of +70° C. (Note: The value of $t_c - t_i$ for Step 8 shall be as close as possible to that value obtained in Step 7.)

Figure 6:
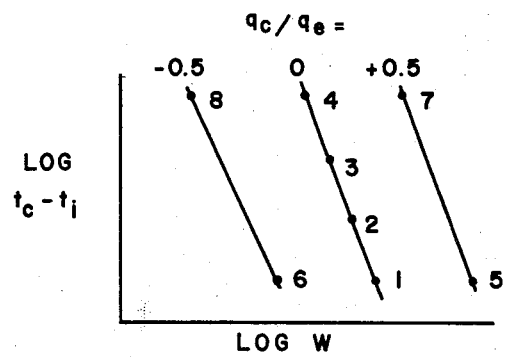
FIGURES 6 to 11 are typical graphs showing the reduction of test data derived from using the heat transfer test fixture.
Figure 7:
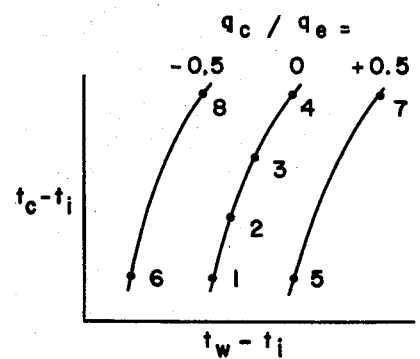

The heat transfer test data is reduced as follows:

(1) From the data of Steps 1 through 4, the center curve ($q_c/q_e = 0$) of FIGURES 6 and 7 is plotted. (Note: Numbers beside the points indicate the respective test steps.)

Figure 8:
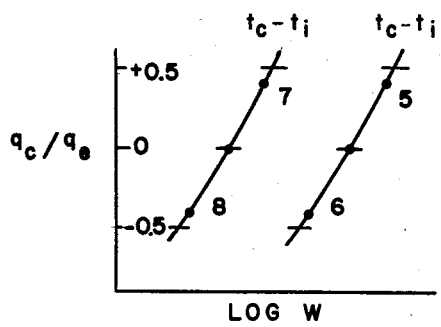
Figure 9:
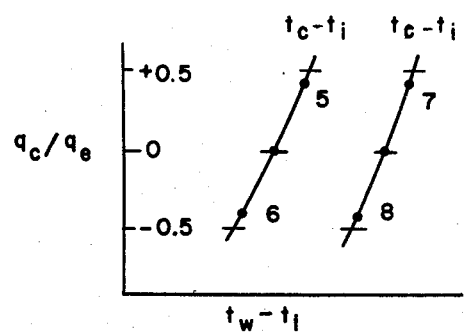

(2) From the data of Steps 5 and 6, plot points 5 and 6 in FIGURES 8 and 9. These points are for the same value of $t_c - t_i$. From FIGURE 6, the log $w$ point corresponding to this value of $t_c - t_i$ is found and is plotted on FIGURE 8 at $q_c/q_e = 0$. From FIGURE 7, the $t_w - t_i$ point corresponding to this same $t_c - t_i$ value is found and plotted on FIGURE 9 at $q_c/q_e = 0$. A smooth curve is drawn through the three points on each graph.

(3) The data of Steps 7 and 8 on FIGURES 8 and 9, is plotted as in paragraph 2 using the value of $t_c - t_i$ associated with test Steps 7 and 8.

(4) The lines drawn on FIGURES 8 and 9 represent $t_c - t_i$ isotherms. These isotherms may be extrapolated, if necessary, to the points where $q_c/q_e$ equals plus and minus 0.5, and these points plotted on FIGURES 6 and 7. The two points on FIGURES 6 and 7 where $q_c/q_e = +0.5$ may be connected if the shape of the curve between them is matched to the curve of $q_c/q_e = 0$. Similarly, curves between the points on FIGURES 6 and 7 where $q_c/q_e = -0.5$ may be drawn.

Figure 10:
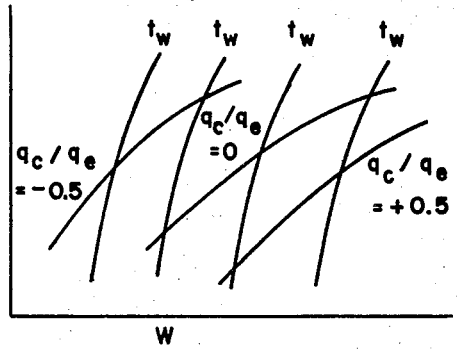

(5) Since $t_c$ is a constant, a plot of $t_i$ versus $w$ may be obtained from FIGURE 6 for values of $q_c/q_e$ equal to −0.5, 0, and +0.5. This graph is prepared on rectangular coordinates as illustrated in FIGURE 10.

(6) Isotherms of $t_w$ is obtained from FIGURE 7 in the following manner:

(a) A single value for $t_w$ and several representative values for $t_i$ are chosen.
(b) $t_w - t_i$ and $t_c - t_i$ for each value of $t_i$ chosen are computed.
(c) Several $t_c - t_i$ versus $t_w - t_i$ points on FIGURE 7 are found and the $q_c/q_e$ values are estimated. (This may be done accurately since rectangular coordinates are used.)
(d) The values of $q_c/q_e$ (for the several values of $t_i$) are plotted on FIGURE 10. A line is drawn through these points to obtain a $t_w$ isotherm. Value of $t_w$ are chosen every ten or twenty degrees over the desired range.

After completion of the heat transfer test, the cooling air pressure drop measurements for forced-air-cooled modules are obtained as follows:

(1) The module is de-energized.
2. Air mass flow rate determined in Step 1 of the heat transfer test procedures is supplied. The pressure drop is measured and recorded.
(3) The module is removed from the fixture and the fixture is reassembled.
(4) Again the same air mass flow rate as in Step 1 of the heat transfer test procedures is provided. The pressure drop is measured and recorded.

The pressure drop across the module is now calculated by subtracting the pressure drop obtained in No. 4 above from the pressure drop recorded in No. 2 above.

Figure 11:
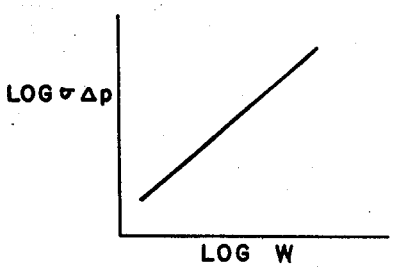

The $\sigma p$ versus $w$ correlation (FIGURE 11) may be determined by standard means. (Note: It is convenient to use, when possible, the inlet air temperature and the outlet air pressure in the determination of the proper density ratio ($\sigma$).)

Numerous modifications and variations of this invention not specifically described herein will be apparent to those skilled in the art and are intended to be comprehended and included herein. Heat transfer test devices of various dimensions and configurations other than specifically described and illustrated herein may be constructed. While this invention has been described as employing an internally positioned device for conditioning cooling air to the test chamber, it is readily apparent an externally positioned device could also be used and still not depart from the scope of this invention. The heat transfer test device is applicable in establishing the heat transfer characteristics of the described component parts herein, as well as any other heat dissipating device.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention set forth in the appended claims.

What is claimed is:

1. A heat transfer test device comprising in combination an insulated housing, the housing having a chamber for testing an electronic module therein; the housing including a top portion having an inlet air manifold and a heating plate, the incoming air from the manifold being cooled by a cooling medium in the top portion and being heated to the desired temperature by the heating plate prior to the introduction of air into the test chamber; means for heating the heating plate; a heat barrier panel spaced from the heating plate to form the bottom of an inlet air chamber and to isolate the heat in the inlet air chamber from the test chamber, said heat barrier panel having an air inlet aperture therethrough; a mounting plate positioned below the heat barrier panel forming the upper wall of the test chamber; movably adjustable heating walls perpendicularly mounted to the mounting plate to form the vertical walls of the test chamber; means for heating the heated walls; an insulating gasket forming the lower wall of the test chamber and serving as an air seal between the desired electronic module in the test chamber and the heating walls; a base member for supporting the insulating gasket; the insulating gasket and the base member containing openings therethrough to allow air to pass from the module test chamber to the exterior of the test device; and thermocouple means to measure the temperature within the chamber.

2. A heat transfer test device comprising in combination an insulated housing, the housing having a chamber for testing an electronic module therein; the housing including a top portion having an inlet air manifold and a heating plate, the incoming air through the manifold being heated to the desired temperature by the heating plate prior to the introduction of air into the test chamber; means for heating the heating plate; a heat barrier panel spaced from the heating plate; the heating plate and the heat barrier panel forming the top and bottom of an inlet air chamber, respectively; the heat barrier panel isolating the heat in the inlet air chamber from the test chamber and having an air inlet aperture therethrough; a mounting plate positioned below the heat barrier panel forming the upper wall of the test chamber; movably adjustable heating walls perpendicularly mounted to the mounting plate to form the vertical walls of the test chamber; means for heating the heated walls; an insulating gasket forming the lower wall of the test chamber and serving as an air seal between the electronic module in the test chamber and the heating walls; a base member for supporting the insulating gasket; the insulating gasket and the base member containing openings therethrough to allow air to pass from the module test chamber to the exterior of the test device; and thermocouple means to measure the temperature within the chamber.

3. A heat transfer test device comprising in combination an insulated housing, the housing having a chamber for testing an electronic module therein; the housing including a top portion having an inlet air manifold and a heating plate, the incoming air through the manifold being heated to the desired temperature by the heating plate prior to the introduction of air into the test chamber; means for heating the heating plate; a heat barrier panel spaced from the heating plate to form the bottom of an inlet air chamber and to isolate the heat in the inlet air chamber from the test chamber, said heat barrier panel having an air inlet aperture therethrough; a mounting plate positioned below the heat barrier panel forming the upper wall of the test chamber; movable heating walls perpendicularly mounted to the mounting plate to form the vertical walls of the test chamber, each of the vertical heating walls being independently adjustable with respect to each other; the vertical walls forming an offset arrangement of chamber members to enclose the electronic module therein; means for heating the heated walls; an insulating gasket forming the lower wall of the test chamber and serving as an air seal between the desired electronic module in the test chamber and the heating walls; a base member for supporting the insulating gasket; the insulating gasket and the base member containing openings therethrough to allow air to pass from the module test chamber to the exterior of the test device; and thermocouple means to measure the temperature within the chamber.

4. A heat transfer test device comprising in combination an insulated housing, the housing having a chamber for testing a selective sized electronic module therein; the housing including a top portion having an inlet air manifold and a heating plate, the incoming air through the manifold being heated to the desired temperature by the heating plate prior to the introduction of air into the test chamber; means for heating the heating plate; a heat barrier panel positioned below the heating plate; the heating plate and the heat barrier panel forming with the upper interior walls of the test device an inlet air chamber, the inlet air chamber isolating the surplus heat from the test chamber; the heat barrier panel having an air inlet aperture therethrough; a mounting plate positioned below the heat barrier panel forming the upper wall of the test chamber; a plurality of walls perpendicularly mounted to the mounting plate to form the vertical walls of the test chamber; each of the vertical walls adapted to be adjusted on the vertical plane of the adjacent wall; the vertical walls forming an offset-arranged walled structure whereby the selective sized electronic module is enclosed therein; means for heating the walls; and insulating gasket forming the lower wall of the test chamber and serving as an air seal between the desired electronic module in the test chamber and the heating walls; a base member for supporting the insulating gasket; the insulating gasket and the base member containing openings therethrough to allow the cooling air to pass from the module test chamber to the exterior of the test device; and thermocouple means to measure the temperatures at various locations within the test device.

5. A heat transfer test device comprising an insulated housing; a chamber within said housing for supporting an electronic module to be tested; the interior of said housing including a plurality of relatively movable walls forming the exterior of said chamber, said walls being movable to enable different sized modules to be placed in the chamber; means for heating said walls to maintain a heat balance within said chamber; means for providing an air passage through the interior of said housing; said passage including said chamber and subsisting on either side of said said chamber; means for heating the air in said passage upstream of the air entry into the chamber; and means for measuring temperatures at a predetermined location in said housing.

6. The device of claim 5 wherein said means for heating the air includes a heated plate over which the air circulates.

7. A heating transfer test apparatus to aid in determining the amount of gas flow and the temperature of said gas necessary to cool a device subjected in operation to known heating environments comprising a heat insulating housing, said housing including interiorly thereof a chamber for enclosing the device, said chamber having an exterior surface, means for heating all of said surface and supplying sufficient heat to the interior of said chamber to maintain a predetermined heat balance within said chamber, said heat balance insulating the interior of said chamber from the exterior thereof, means for supplying gas having a controlled temperature and flow rate to the device in the chamber, and means for measuring temperature within the chamber.

8. The apparatus of claim 7 wherein said means for supplying comprises a heat exchanger having upper and lower surfaces responsive to cooling and heating agents, respectively, said surfaces cooling and heating the gas passing adjacent thereto.

9. The apparatus of claim 8 wherein is further provided a heat barrier in the gas supply means between said exchanger and said chamber.

10. The apparatus of claim 7 wherein means are provided for at will varying the length of said surface surrounding said chamber.

11. The apparatus of claim 7 further including means for measuring the temperature of said gas as it enters and leaves said chamber, and means for measuring the gas flow rate and pressure within said chamber.

12. The apparatus of claim 7 wherein said housing comprises insulated walls within which said chamber is located, the exterior heated surface of said chamber being spaced from said interior walls to provide channels for the circulation of gases.

13. A heat transfer test device comprising an insulated housing, said housing having interior chambers for testing an electronic module therein, said housing including a top portion having an inlet air manifold and a heating plate located at the bottom of the manifold, the incoming air from the manifold being cooled by a cooling medium in the top portion and being heated to the desired temperature by the heating plate prior to its introduction into the test chamber, means for heating the heating plate, a heat barrier panel spaced from the heating plate to form the bottom of an inlet air chamber and to isolate the heat in the inlet air chamber from the test chamber, said heat barrier panel having an air inlet aperture through it for heating air emerging from the inlet air chamber and entering said interior chamber, said interior chamber including a heated surface surrounding said module, means for heating the heated surface, an insulating gasket forming the lower surface of the interior chamber and serving as an air seal between said module and said heated surface, the insulating gasket containing an opening through it to allow air to pass from the interior chamber to the exterior of the test device, and means to measure the temperature at a predetermined location within the test device.

References Cited in the file of this patent
UNITED STATES PATENTS

| | | |
|---|---|---|
| 1,967,185 | Clapp | July 17, 1934 |
| 2,510,952 | Brewster | June 13, 1950 |
| 2,756,319 | Hatch | July 24, 1956 |
| 2,769,334 | Soehngen | Nov. 6, 1956 |